(12) United States Patent
Mukherjee et al.

(10) Patent No.: US 11,743,114 B1
(45) Date of Patent: Aug. 29, 2023

(54) BIDIRECTIONAL FORWARDING DETECTION CONTROL PACKET TO INDICATE MAINTENANCE MODE OPERATION

(71) Applicant: Juniper Networks, Inc., Sunnyvale, CA (US)

(72) Inventors: Sounak Mukherjee, Bangalore (IN); Srinivasa Rao Nandyala, Bangalore (IN); Himanshu Kumar Tambakuwala, Bengaluru (IN)

(73) Assignee: Juniper Networks, Inc., Sunnyvale, CA (US)

(*) Notice: Subject to any disclaimer, the term of this patent is extended or adjusted under 35 U.S.C. 154(b) by 9 days.

(21) Appl. No.: 17/443,509

(22) Filed: Jul. 27, 2021

Related U.S. Application Data

(63) Continuation of application No. 16/577,520, filed on Sep. 20, 2019, now Pat. No. 11,088,897.

(51) Int. Cl.
*H04L 41/0677* (2022.01)
*H04L 41/0654* (2022.01)
*H04L 41/0686* (2022.01)
*H04L 45/12* (2022.01)
*H04L 47/11* (2022.01)

(52) U.S. Cl.
CPC ...... *H04L 41/0677* (2013.01); *H04L 41/0672* (2013.01); *H04L 41/0686* (2013.01); *H04L 45/123* (2013.01); *H04L 47/115* (2013.01)

(58) Field of Classification Search
CPC ............. H04L 41/0677; H04L 41/0672; H04L 41/0686; H04L 45/123; H04L 47/115
See application file for complete search history.

(56) References Cited

U.S. PATENT DOCUMENTS

| | | | |
|---|---|---|---|
| 7,738,367 B1 * | 6/2010 | Aggarwal | H04L 45/28 370/237 |
| 9,253,097 B1 | 2/2016 | Barman et al. | |
| 9,680,694 B1 | 6/2017 | Kotrabasappa et al. | |
| 9,838,248 B1 | 12/2017 | Grammel et al. | |
| 9,838,316 B2 | 12/2017 | Hegde et al. | |
| 10,541,904 B2 * | 1/2020 | Devarajan | H04L 45/745 |
| 11,088,897 B2 | 8/2021 | Mukherjee et al. | |
| 2006/0056411 A1 | 3/2006 | Badat et al. | |
| 2018/0183654 A1 | 6/2018 | Patel et al. | |
| 2019/0058653 A1 | 2/2019 | Mirsky et al. | |
| 2020/0036580 A1 | 1/2020 | Raj et al. | |
| 2020/0344150 A1 | 10/2020 | Vasseur | |
| 2020/0344152 A1 * | 10/2020 | Pignataro | H04L 45/28 |

OTHER PUBLICATIONS

Extended European Search Report and Written Opinion for EP19218767.2, dated May 29, 2020, 9 pages.
Katz D., et al., "Bidirectional Forwarding Detection (BFD)", Internet Engineering Task Force, Internet Society (ISOC), Jun. 1, 2010, pp. 1-49, XP015070820.

* cited by examiner

*Primary Examiner* — Brian T O Connor
(74) *Attorney, Agent, or Firm* — Harrity & Harrity, LLP

(57) ABSTRACT

A first network device may determine to transition to a maintenance mode. The first network device may transmit, to a second network device, a bidirectional forwarding detection (BFD) control packet that includes an indication that the first network device is in the maintenance mode.

20 Claims, 8 Drawing Sheets

BIDIRECTIONAL FORWARDING DETECTION CONTROL PACKET TO INDICATE MAINTENANCE MODE OPERATION

RELATED APPLICATION

This application is a continuation of U.S. patent application Ser. No. 16/577,520, filed Sep. 20, 2019 (now U.S. Pat. No. 11,088,897), which is incorporated herein by reference in its entirety.

BACKGROUND

Bidirectional forwarding detection (BFD) protocol may be used to detect faults on a link between two network devices. Network devices may exchange BFD control packets at a particular time interval and/or based on a request for a BFD control packet being transmitted. A network device may detect a fault associated with a link based on whether a BFD control packet (or a quantity of BFD control packets) is received from another network device associated with the link within the time interval, based on whether a BFD control packet is received in response to a request, and/or the like.

SUMMARY

According to some implementations, a method may include determining, by a first network device, to transition to a maintenance mode; and generating, by the first network device, a bidirectional forwarding detection (BFD) control packet that includes a diagnostic code field that indicates that the first network device is in the maintenance mode; and transmitting, by the first network device and to a second network device, the BFD control packet to permit the second network device to perform an action based on the diagnostic code field that indicates that the first network device is in the maintenance mode.

According to some implementations, a first network device may include one or more memories and one or more processors to receive, from a second network device, a BFD control packet that includes an indication that the second network device is in a maintenance mode; process the BFD control packet to determine the indication that the second network device is in the maintenance mode; and perform, based on the indication that the second network device is in the maintenance mode, one or more actions associated with a link between the first network device and the second network device.

According to some implementations, a non-transitory computer-readable medium may store one or more instructions. The one or more instructions, when executed by one or more processors of a first network device may cause the one or more processors to determine to transition to a maintenance mode; and transmit, to a second network device, a BFD control packet that includes an indication that the first network device is in the maintenance mode.

DETAILED DESCRIPTION

Figure 1A:
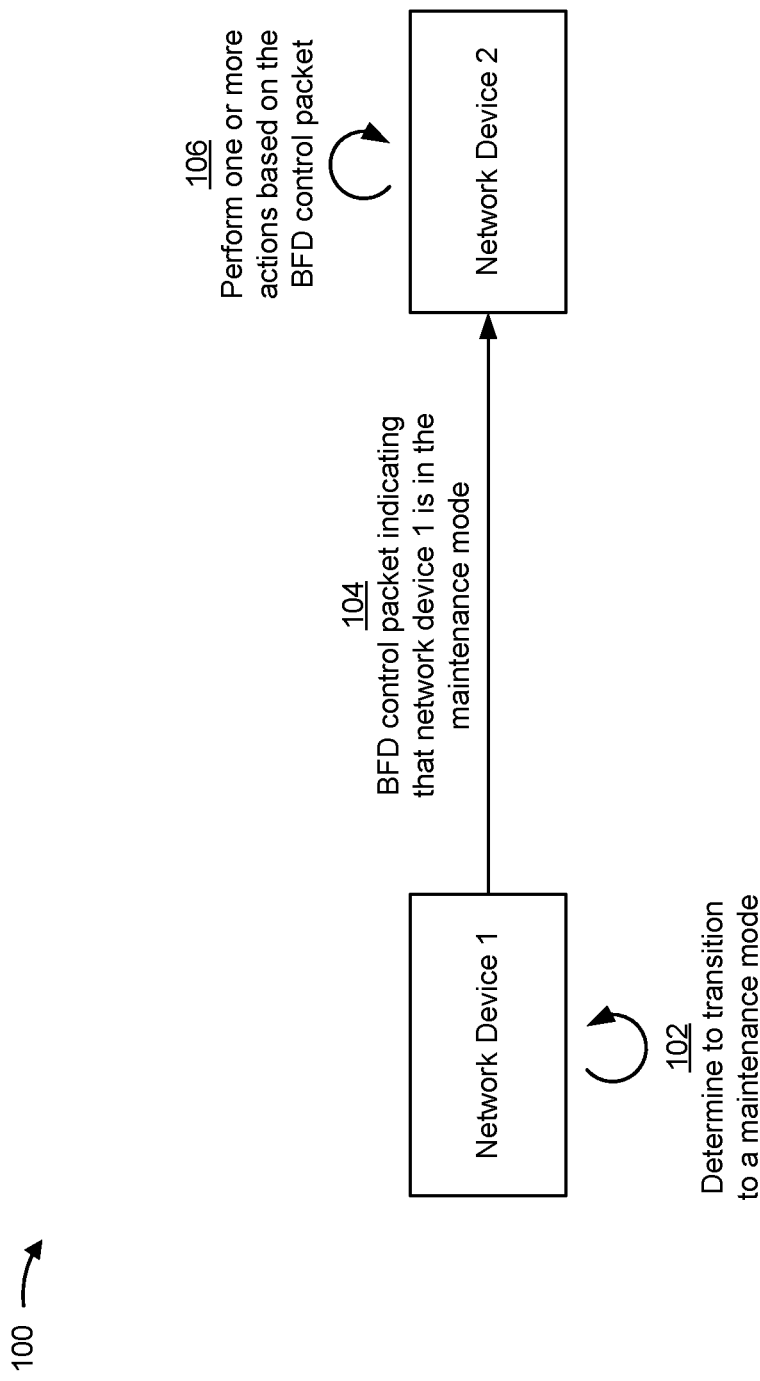
FIGS. 1A and 1B are diagrams of one or more example implementations described herein.

The following detailed description of example implementations refers to the accompanying drawings. The same reference numbers in different drawings may identify the same or similar elements.

A network deployment may include a plurality of network devices that are communicatively connected via one or more links. The network devices may implement one or more networking and/or routing protocols over the links, such as border gate protocol (BGP), open shortest path first (OSPF), intermediate system to intermediate system (IS-IS) protocol, and/or the like.

In some cases, a network device may enter a maintenance mode so that maintenance (e.g., software and/or firmware updates, bug fixes, configuration updates, and/or the like) may be performed on the network device. However, some networking protocols, such as BGP and/or other exterior gateway protocols, may not provide a mechanism to divert forwarding plane traffic away from the network device while the network device is in the maintenance mode. As a result, these networking protocols may need to be deactivated and/or the links associated with the network device may need to be brought down in order to divert forwarding plane traffic away from the network device while the network device is in the maintenance mode. This may result in frequent routing table updates, forwarding information base updates, and/or other updates in the network deployment to remove the links while the network device is in the maintenance mode and to add the links back after the network device is transitioned back into an active mode. This may cause increased consumption of processing, memory, and/or network resources, may cause delays in forwarding plane traffic forwarding, may cause forwarding plane traffic to be dropped, and/or the like.

According to some implementations described herein, a network device may use a bidirectional forwarding detection (BFD) control packet to indicate to other network devices that the network device is in a maintenance mode. In some implementations, the network device may transmit a BFD control packet to another network device. The BFD control packet may include a diagnostic code field, which may be used to indicate a change in session diagnostic parameter of a BFD session of the network device. The network device may configure the diagnostic code field to include a particular value such that the diagnostic code field indicates that the network device is in the maintenance mode.

The other network device may identify the particular value in the diagnostic code field and may perform one or more actions associated with a link between the network device and the other network device to divert forwarding plane traffic away from the network device while the network device is in the maintenance mode, such as increasing an OSPF link cost of the link, increasing a route cost of one or more routes that includes the link, decreasing a BGP local preference of one or more routes that includes the link, and/or the like.

In this way, the network device may use the diagnostic code field in the BFD control packet to divert traffic away from the network device while the network device is in the maintenance mode and without deactivating other network protocols or bringing down the links associated with the network device. This decreases consumption of processing, memory, and/or network resources, decreases delays in forwarding plane traffic forwarding, decreases the likelihood of forwarding plane traffic being dropped, and/or the like as a result of the network device being in the maintenance mode.

Figure 1B:
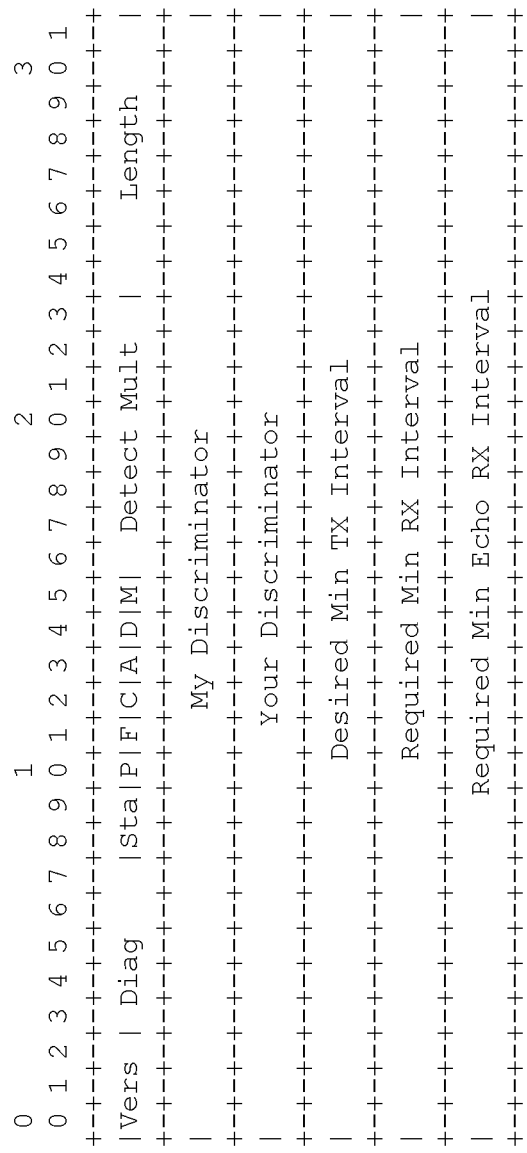

FIGS. 1A and 1B are diagrams of one or more example implementations 100 described herein. As shown in FIGS. 1A and 1B, example implementation(s) 100 may include communication between a plurality of network devices, such as network device 1 and network device 2. In some implementations, network device 1 and network device 2 may be included in a network deployment and may be communicatively connected by one or more links. In some implementations, example implementation(s) 100 may include a greater quantity of network devices.

As shown in FIG. 1A, and by reference number 102, network device 1 may determine to transition to a maintenance mode. In some implementations, the maintenance mode may include an operational mode in which network device 1 does not forward forwarding plane traffic in the network deployment. The maintenance mode may further include an operational mode in which software and/or firmware updates may be performed on network device 1, debugging and/or troubleshooting may be performed on network device 1, control plane and/or forwarding plane configuration updates may be performed on network device 1, and/or the like.

In some implementations, network device 1 may determine to transition to the maintenance mode based on receiving an instruction to transition to the maintenance mode. For example, the instruction may be provided as input to network device 1 by a user, may be provided via a link from another network device (e.g., network device 2 and/or another network device), and/or the like. In some implementations, network device 1 may determine to transition to the maintenance mode based on detecting an event, such as a fault associated with network device 1 (e.g., a control plane or forwarding plane fault, a processing system fault, and/or the like), a fault associated with a link associated with network device 1, and/or the like.

As further shown in FIG. 1A, and by reference number 104, network device 1 may generate and transmit a BFD control packet that indicates that network device 1 is in the maintenance mode. In some implementations, network device 1 may generate and transmit the BFD control packet based on determining to transition to the maintenance mode. In some implementations, network device 1 may transmit the BFD control packet to network device 2 and/or other network devices in the network deployment to which network device 1 is communicatively connected via a link.

In some implementations, the BFD control packet may be transmitted as part of a BFD session associated with network device 1 and network device 2. In this case, network device 1 may transmit the BFD control packet based on a time interval for transmitting BFD control packets in the BFD session. Moreover, network device 1 may continue to transmit BFD control packets that indicate that network device 1 is in the maintenance mode while network device 1 continues to operate in the maintenance mode.

In some implementations, network device 1 may configure a diagnostic code field, included in the BFD control packet, to indicate that network device 1 is in the maintenance mode. For example, network device 1 may configure the diagnostic code field to include a particular value that indicates that network device 1 is in the maintenance mode. The particular value may function as an overload indicator (e.g., may indicate that overload is enabled on network device 1). The overload indicator may be an indication that network device 1 cannot process additional forwarding plane traffic and that forwarding plane traffic should be redirected away from network device 1. In some implementations, network device 1 may use a diagnostic code field reserved value for the particular value, in which case the particular value may be represented by one or more bits associated with the reserved value.

Network device 2 may receive the BFD control packet and may process the BFD control packet to identify the diagnostic code field in the BFD control packet, and to identify the particular value included in the diagnostic control field. Network device 2 may be configured to determine that the particular value is an indicator that network device 1 is in the maintenance mode.

As further shown in FIG. 1A, and by reference number 106, network device 2 may perform one or more actions based on the BFD control packet. In particular, network device 2 may perform one or more actions to divert forwarding plane traffic away from the link between network device 1 and network device 2 based on determining that the BFD control packet indicates that network device 1 is in the maintenance mode.

In some implementations, the one or more actions may include setting an overload detected parameter, associated with the BFD session of the network device 2, to a particular value. In this case, other networking protocols operating on network device 2 that are clients of the BFD session (e.g., IS-IS protocol, OSPF protocol, BGP, and/or the like) may identify the particular value and perform one or more actions.

For example, the OSPF protocol operating on network device 2 may increase an OSPF link cost of the link between network device 1 and network device 2 such that the increased OSPF link cost causes network device 2 to generate routes that do not include the link. In this case, network device 2 may transmit an indication of the increased OSPF link cost to other network devices in the network deployment such that the other network devices may generate routes that do not include the link.

As another example, network device 2 may increase a route cost of one or more routes that include the link between network device 1 and network device 2, such that the increased route cost causes network device 2 to avoid routing forwarding plane traffic using the one or more routes (e.g., to route the forwarding plane traffic via alternate routes that do not include the one or more routes). In this case, network device 2 may transmit an indication of the increased route cost of the one or more routes to other network devices in the network deployment such that the other network devices route forwarding plane traffic via alternate routes.

As another example, a routing protocol operating on network device 2 may decrease a BGP local preference of one or more routes that include the link between network device 1 and network device 2 such that the decreased BGP local preference causes network device 2 to avoid routing forwarding plane traffic using the one or more routes (e.g., to route the forwarding plane traffic via alternate routes that do not include the one or more routes). In this case, network device 2 may transmit an indication of the decreased BGP local preference of the one or more routes to other network devices in the network deployment such that the other network devices route forwarding plane traffic via alternate routes.

In some implementations, network device 1 may subsequently transition out of the maintenance mode and into an active mode (e.g., a mode in which network device 1 forwards forwarding plane traffic in the network deployment). In this case, network device 1 may generate and transmit another BFD control packet to network device 2 and/or other network devices, where the other BFD control packet indicates that network device 1 is no longer in the maintenance mode. For example, network device 1 may generate the other BFD control packet such that a diagnostic code field, included in the BFD control packet, includes a particular value that indicates that network device 1 is no longer in the maintenance mode. In this case, the particular value may include a 0 value associated with a No Diagnostic indicator or another value that may indicate that network device 1 is no longer in the maintenance mode.

Network device 2 may receive the other BFD control packet, may identify the particular value in the diagnostic control field, and may determine that the particular value indicates that network device 1 is no longer in the maintenance mode. In this case, network device 2 may perform one or more actions to cause forwarding plane traffic to be routed via the link between network device 1 and network device 2. For example, network device 2 may set the overload detected parameter, associated with the BFD session of the network device 2, to a particular value that indicates that an overload associated with network device 1 is not detected. As another example, network device 2 may decrease the OSPF link cost of the link between network device 1 and network device 2. As another example, network device 2 may decrease a route cost of the one or more routes that include the link between network device 1 and network device 2. As another example, network device 2 may increase the BGP route preference of the one or more routes that include the link between network device 1 and network device 2.

FIG. 1B illustrates an example BFD control packet format. The version field (Vers) may identify a version number of BFD associated with the BFD session of network device 1 and network device 2. The diagnostic code field (Diag) may identify a reason for a change in session diagnostic parameter of the BFD session. This field may be used to indicate that a network device is in a maintenance mode (e.g., by including a particular value associated with a maintenance mode or overload associated with the network device). The state field (Sta) may indicate a current state of the BFD session. The poll field (P) may be used to request verification of connectivity on the link between network device 1 and network device 2.

The final field (F) may be used to respond to a BFD control packet in which the poll field is set to request verification of connectivity. The control plane independent field (C) may indicate whether the BFD session is implemented in a forwarding plane and can continue to function through disruptions in the control plane. The authentication present field (A) may indicate whether the BFD session is to be authenticated. The demand mode field (D) may indicate whether the BFD session is to operate in demand mode, in which case BFD control packets may be exchanged based on requests for the BFD control packets. The multipoint (M) field may indicate whether any point-to-multipoint extensions are active for the BFD session.

The detection time multiplier field (Detect Mult) may identify a particular time value by which a time interval for exchanging BFD control packets is to be multiplied. The length field may identify a length of the BFD control packet in bytes. The my discriminator field may identify a unique nonzero discriminator value that may be used to demultiplex a plurality of BFD sessions. The your discriminator field may be used to reflect back a received value in a my discriminator field. The desired minimum transmit interval field (Desired Min Tx Interval) may identify a minimum time interval for transmitting BFD control packets for the BFD session.

The required minimum receive interval (Required Min RX Interval) field may identify a minimum time interval between received BFD Control packets that network device 1 or network device 2 is capable of supporting. The required minimum echo receive interval (Required Min Echo RX Interval) field may identify a minimum time interval between received BFD Echo packets that network device 1 or network device 2 is capable of supporting.

In this way, network device 1 may transmit a BFD control packet to network device 2, which may include a diagnostic code field that may be used to indicate a change in session diagnostic parameter of a BFD session of network device 1. Network device 1 may configure the diagnostic code field to include a particular value such that the diagnostic code field indicates that the network device is in the maintenance mode. Network device 2 may identify the particular value in the diagnostic code field and may perform one or more actions associated with a link between network device 1 and network device 2 to divert forwarding plane traffic away from network device 1 while network device 1 is in the maintenance mode, without network device 1 having to deactivate other network protocols or bring down the link. This decreases consumption of processing, memory, and/or network resources, decreases delays in forwarding plane traffic forwarding, decrease the likelihood of forwarding plane traffic being dropped, and/or the like as a result of network device 1 being in the maintenance mode.

As indicated above, FIGS. 1A and 1B are provided merely as one or more examples. Other examples may differ from what is described with regard to FIGS. 1A and 1B.

Figure 2:
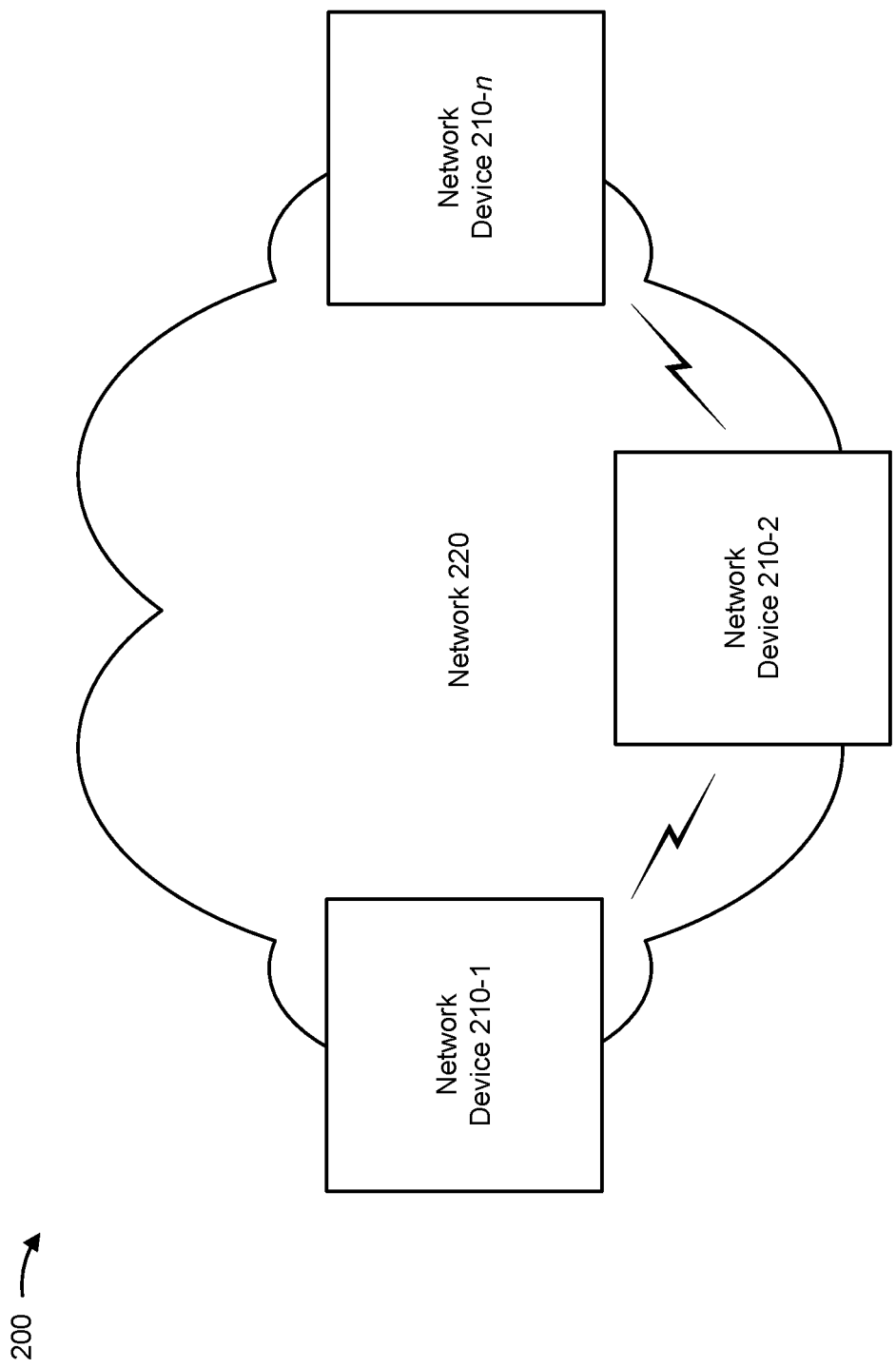
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-*n* (n≥1) (hereinafter referred to collectively as "network devices 210," and individually as "network device 210") and a network 220. Devices of environment 200 may interconnect via wired connections, wireless connections, or a combination of wired and wireless connections. In some implementations, network devices 210 may be linked and/or connected together to form a high-availability cluster. In some implementations, the high-availability cluster may include a plurality of nodes (e.g., two or more nodes) that are implemented by network devices 210.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, a network device 210 may determine to transition to a maintenance mode, may generate a BFD control packet that includes a diagnostic code field that indicates that the network device 210 is in the maintenance mode, may transmit, to another network device 210, the BFD control packet to permit the other network device 210 to perform an action based on the diagnostic code field that indicates that the network device 210 is in the maintenance mode, and/or the like. In some implementations, the other network device 210 may process the BFD control packet to determine the indication that the network device 210 is in the maintenance mode and may perform, based on the indication that the network device 210 is in the maintenance mode, one or more actions associated with the link.

Network 220 includes one or more wireless networks. For example, network 220 may include a cellular network (e.g., a long-term evolution (LTE) network, a code division multiple access (CDMA) network, a 3G network, a 4G network, a 5G network, another type of cellular network, and/or the like), a wireless local area network (WLAN) (e.g., a Wi-Fi network, an unlicensed spectrum wireless network, and/or the like), a wireless peer-to-peer (P2P) network (e.g., Wi-Fi direct, Bluetooth, and/or the like), and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
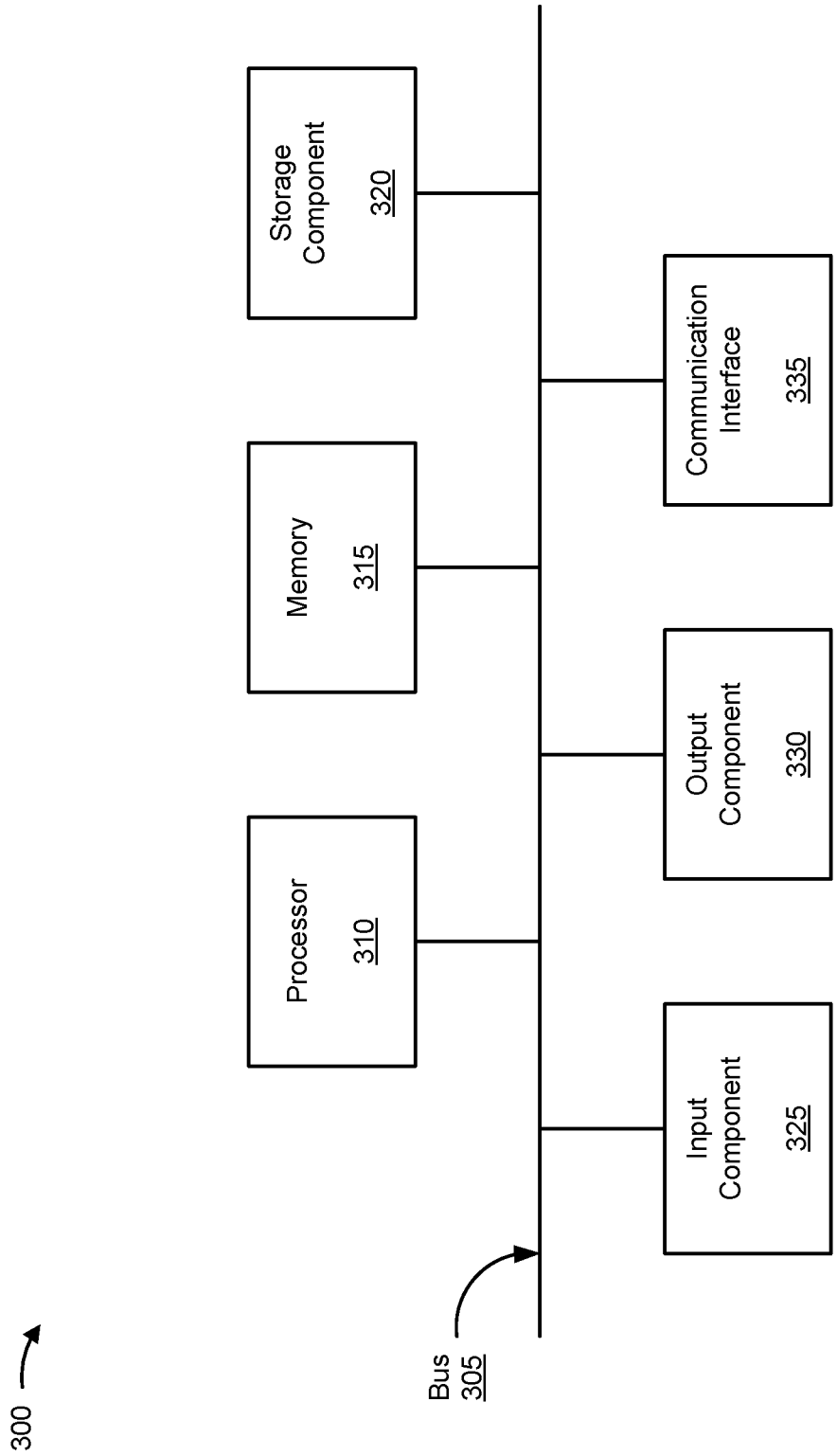
FIGS. 3A and 3B are diagrams of example components of one or more devices of FIG. 2.
Figure 3B:
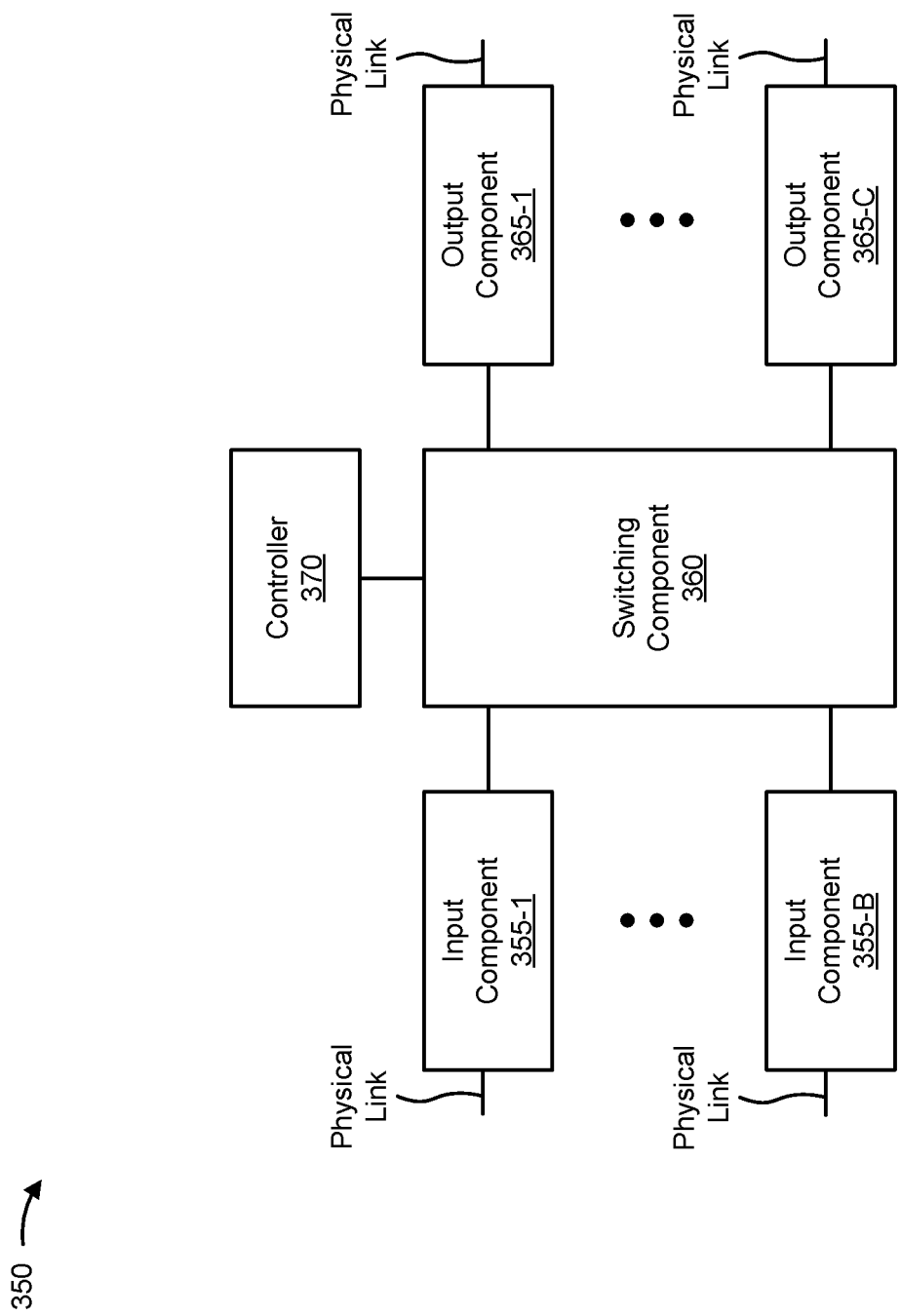

FIGS. 3A and 3B are diagrams of example components of one or more devices of FIG. 2. FIG. 3A is a diagram of example components of a device 300. In some implementations, device 300 may correspond to device 210. In some implementations, device 210 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. In some implementations, device 350 may correspond to device 210. In some implementations, device 210 may include one or more devices 350 and/or one or more components of device 350. As shown in FIG. 3B, device 350 may include one or more input components 355-1 through 355-B ($B \geq 1$) (hereinafter referred to collectively as input components 355, and individually as input component 355), a switching component 360, one or more output components 365-1 through 365-C ($C \geq 1$) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., an input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, and/or the like) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A "computer-readable medium" as used herein is a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B.

Figure 4:
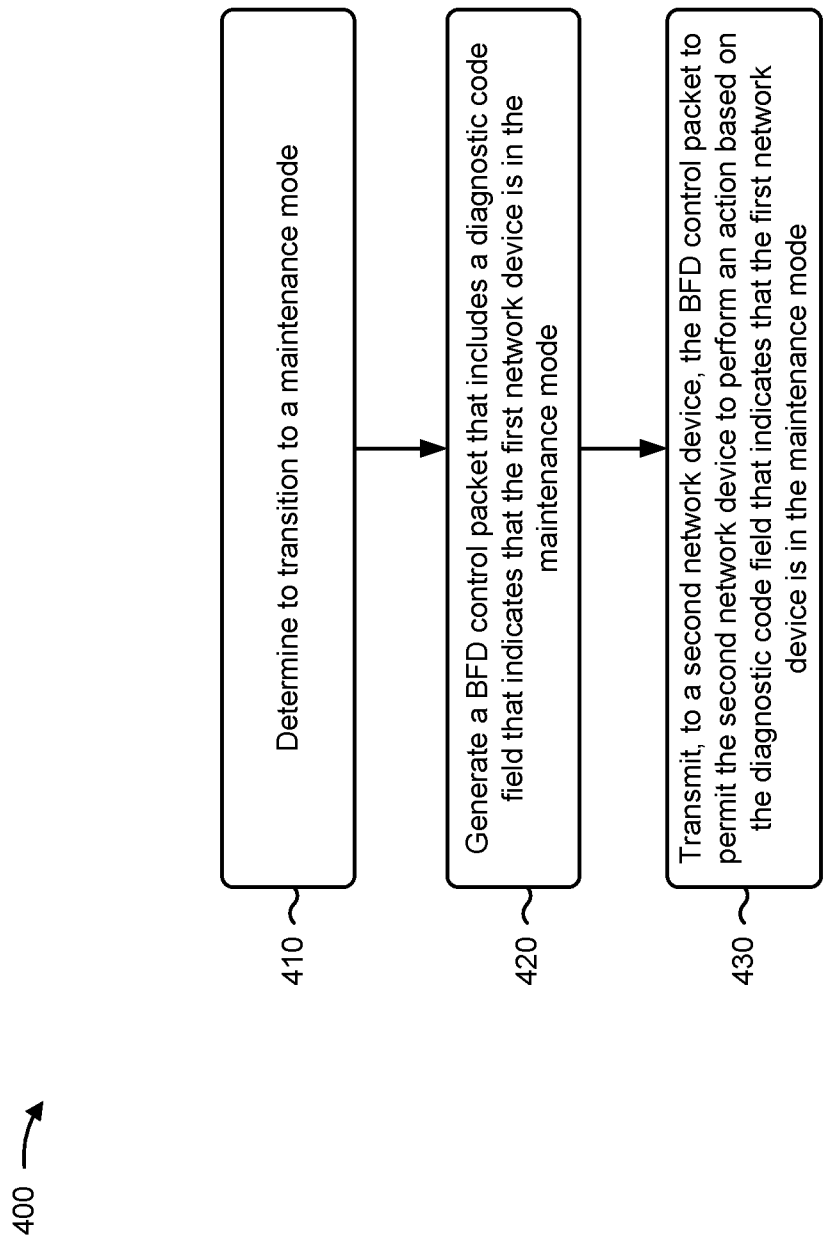
FIGS. 4-6 are flowcharts of example processes for bidirectional forwarding detection (BFD) control packet indication of maintenance mode operation.

FIG. 4 is a flow chart of an example process 400 for transmitting a BFD control packet to indicate maintenance mode operation. In some implementations, one or more process blocks of FIG. 4 may be performed by a first network device (e.g., network device 210, device 300, device 350, and/or the like). In some implementations, one or more process blocks of FIG. 4 may be performed by another device or a group of devices separate from or including the first network device, such as another network device and/or the like.

As shown in FIG. 4, process 400 may include determining to transition to a maintenance mode (block 410). For example, the first network device (e.g., using processor 310, memory 315, storage component 320, input component 325, output component 330, communication interface 335, input component 355, switching component 360, output component 365, controller 370, and/or the like) may determine to transition to a maintenance mode, as described above.

As further shown in FIG. 4, process 400 may include generating a BFD control packet that includes a diagnostic code field that indicates that the first network device is in the maintenance mode (block 420). For example, the first network device (e.g., using processor 310, memory 315, storage component 320, input component 325, output component 330, communication interface 335, input component 355, switching component 360, output component 365, controller 370, and/or the like) may generate a BFD control packet that includes a diagnostic code field that indicates that the first network device is in the maintenance mode, as described above.

As further shown in FIG. 4, process 400 may include transmitting, to a second network device, the BFD control packet to permit the second network device to perform an action based on the diagnostic code field that indicates that the first network device is in the maintenance mode (block 430). For example, the first network device (e.g., using processor 310, memory 315, storage component 320, input component 325, output component 330, communication interface 335, input component 355, switching component 360, output component 365, controller 370, and/or the like) may transmit, to a second network device, the BFD control packet to permit the second network device to perform an action based on the diagnostic code field that indicates that the first network device is in the maintenance mode, as described above.

Process 400 may include additional implementations, such as any single implementation or any combination of implementations described below and/or in connection with one or more other processes described elsewhere herein.

In a first implementation, the diagnostic code field includes a particular value, associated with an overload enabled indicator, indicating that the first network device is in the maintenance mode. In a second implementation, alone or in combination with the first implementation, process 400 includes determining to transition from the maintenance mode to an active mode; generating another BFD control packet that includes an indication that the first network device is in the active mode; and transmitting, to the second network device, the other BFD control packet to permit the second network device to perform an action based on the indication that the first network device is in the active mode. In a third implementation, alone or in combination with one or more of the first and second implementations, the indication that the first network device is in the active mode comprises a particular value in the diagnostic code field included in the other BFD control packet, wherein the particular value is associated with a no diagnostic indicator.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
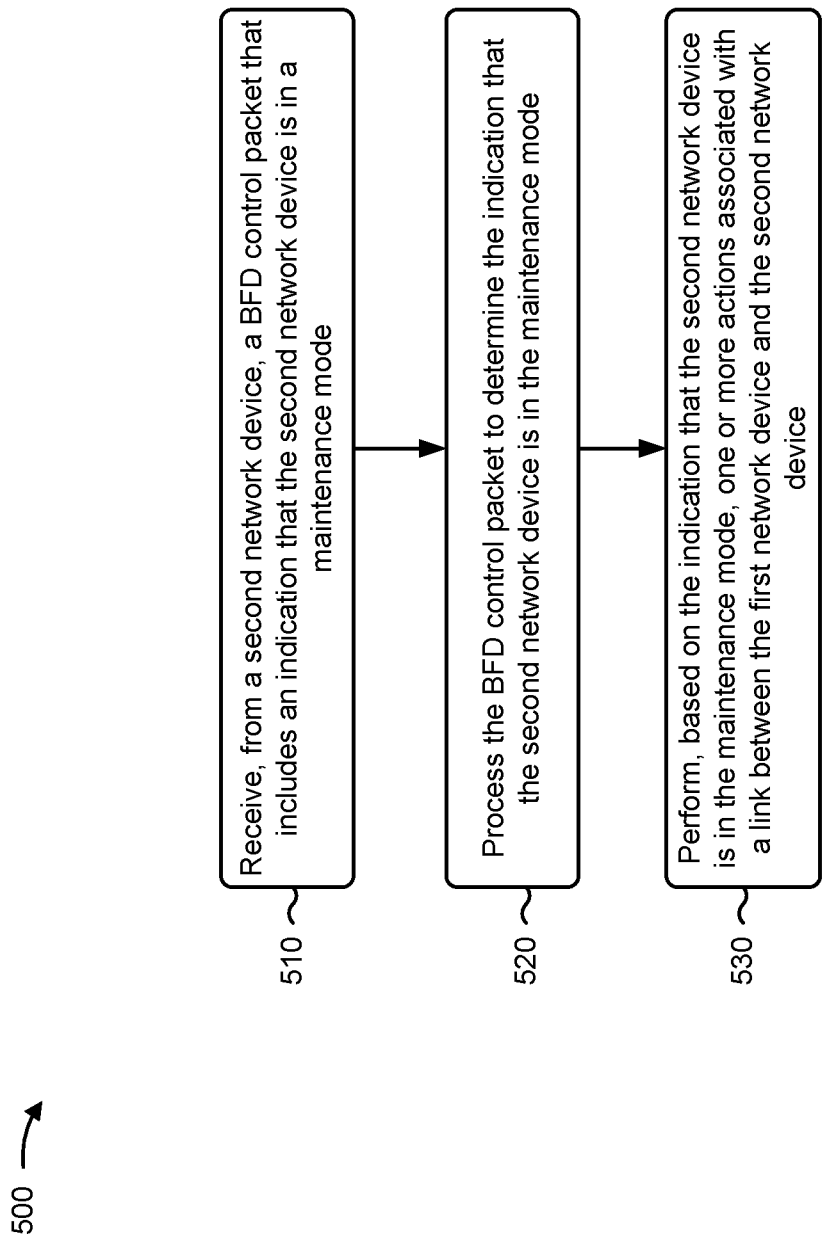

FIG. 5 is a flow chart of an example process 500 for receiving a BFD control packet to indicate maintenance mode operation. In some implementations, one or more process blocks of FIG. 5 may be performed by a first network device (e.g., network device 210, device 300, device 350, and/or the like). In some implementations, one or more process blocks of FIG. 5 may be performed by another device or a group of devices separate from or including the first network device, such as another network device and/or the like.

As shown in FIG. 5, process 500 may include receiving, from a second network device, a BFD control packet that includes an indication that the second network device is in a maintenance mode (block 510). For example, the first network device (e.g., using processor 310, memory 315, storage component 320, input component 325, output component 330, communication interface 335, input component 355, switching component 360, output component 365, controller 370, and/or the like) may receive, from a second network device, a BFD control packet that includes an indication that the second network device is in a maintenance mode, as described above.

As further shown in FIG. 5, process 500 may include processing the BFD control packet to determine the indication that the second network device is in the maintenance mode (block 520). For example, the first network device (e.g., using processor 310, memory 315, storage component 320, input component 325, output component 330, communication interface 335, input component 355, switching component 360, output component 365, controller 370, and/or the like) may process the BFD control packet to determine the indication that the second network device is in the maintenance mode, as described above.

As further shown in FIG. 5, process 500 may include performing, based on the indication that the second network device is in the maintenance mode, one or more actions associated with a link between the first network device and the second network device (block 530). For example, the first network device (e.g., using processor 310, memory 315, storage component 320, input component 325, output component 330, communication interface 335, input component 355, switching component 360, output component 365, controller 370, and/or the like) may perform, based on the indication that the second network device is in the maintenance mode, one or more actions associated with a link between the first network device and the second network device, as described above.

Process 500 may include additional implementations, such as any single implementation or any combination of implementations described below and/or in connection with one or more other processes described elsewhere herein.

In a first implementation, the indication that the second network device is in the maintenance mode comprises a particular value in a diagnostic code field included in the BFD control packet. In a second implementation, alone or in combination with the first implementation, the particular value is associated with an overload enabled indicator. In a third implementation, alone or in combination with one or more of the first and second implementations, process 500 includes setting an overload detected parameter, associated with a BFD session of the first network device, to a particular value. In a fourth implementation, alone or in combination with one or more of the first through third implementations, process 500 includes increasing an OSPF link cost of the link between the first network device and the second network device.

In a fifth implementation, alone or in combination with one or more of the first through fourth implementations, process 500 includes transmitting, to a third network device, an indication of the OSPF link cost based on increasing the OSPF link cost of the link. In a sixth implementation, alone or in combination with one or more of the first through fifth implementations, process 500 includes increasing a route cost of a route that includes the link between the first network device and the second network device. In a seventh implementation, alone or in combination with one or more of the first through sixth implementations, process 500 includes transmitting, to a third network device, an indication of the route cost based on increasing the route cost of the route.

In an eighth implementation, alone or in combination with one or more of the first through seventh implementations, process 500 includes decreasing a border gateway protocol (BGP) local preference of a route that includes the link between the first network device and the second network device. In a ninth implementation, alone or in combination with one or more of the first through eighth implementations, process 500 includes transmitting, to a third network device, an indication of the BGP local preference based on decreasing the BGP local preference of the route.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
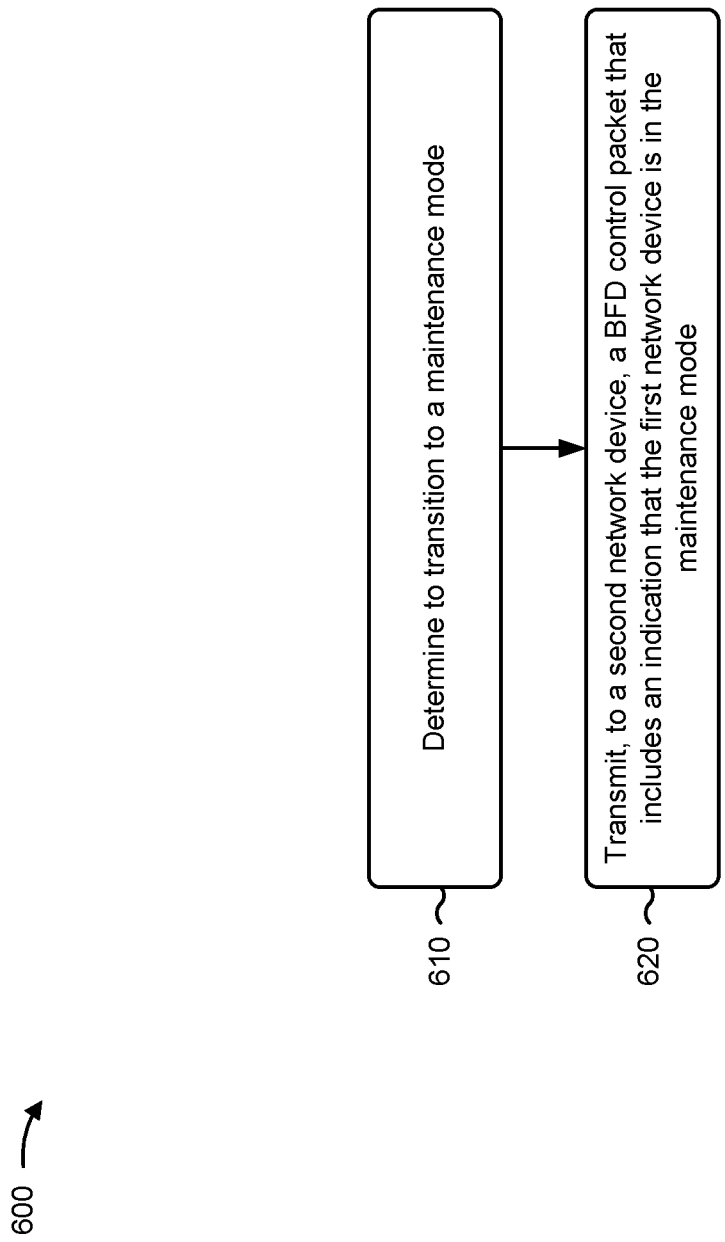

FIG. 6 is a flow chart of an example process 600 for transmitting a BFD control packet to indicate maintenance mode operation. In some implementations, one or more process blocks of FIG. 6 may be performed by a first network device (e.g., network device 210, device 300, device 350, and/or the like). In some implementations, one or more process blocks of FIG. 6 may be performed by another device or a group of devices separate from or including the first network device, such as another network device and/or the like.

As shown in FIG. 6, process 600 may include determining to transition to a maintenance mode (block 610). For example, the first network device (e.g., using processor 310, memory 315, storage component 320, input component 325, output component 330, communication interface 335, input component 355, switching component 360, output component 365, controller 370, and/or the like) may determine to transition to a maintenance mode, as described above.

As further shown in FIG. 6, process 600 may include transmitting, to a second network device, a BFD control packet that includes an indication that the first network device is in the maintenance mode (block 620). For example, the first network device (e.g., using processor 310, memory 315, storage component 320, input component 325, output component 330, communication interface 335, input component 355, switching component 360, output component 365, controller 370, and/or the like) may transmit, to a second network device, a BFD control packet that includes an indication that the first network device is in the maintenance mode, as described above.

Process 600 may include additional implementations, such as any single implementation or any combination of implementations described below and/or in connection with one or more other processes described elsewhere herein.

In a first implementation, the indication that the first network device is in the maintenance mode comprises a particular value in a diagnostic code field included in the BFD control packet. In a second implementation, alone or in combination with the first implementation, the particular value is associated with an overload enabled indicator. In a third implementation, alone or in combination with one or more of the first and second implementations, process 600 includes determining to transition from the maintenance mode to an active mode; and transmitting, to the second network device, another BFD control packet that includes an indication that the first network device is in the active mode.

In a fourth implementation, alone or in combination with one or more of the first through third implementations, the indication that the first network device is in the active mode comprises a particular value in a diagnostic code field included in the BFD control packet. In a fifth implementation, alone or in combination with one or more of the first through fourth implementations, the particular value is associated with a no diagnostic indicator.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
   transitioning, by a first network device, to a maintenance mode associated with enabling maintenance of the first network device;
   generating, by the first network device and based on transitioning to the maintenance mode, a packet that includes a field indicating that the first network device is in the maintenance mode; and
   transmitting, by the first network device and to a second network device, the packet to permit the second network device to perform an action based on the field indicating that the first network device is in the maintenance mode,
      wherein the action includes increasing a route cost of a route associated with a link between the first network device and the second network device.
2. The method of claim 1, wherein the field includes a particular value associated with an overload including at least one of:
   a first indicator indicating that the first network device cannot process additional forwarding plane traffic, or
   a second indicator indicating that the forwarding plane traffic should be redirected away from the first network device.

3. The method of claim 1, wherein the packet is a bidirectional forwarding detection (BFD) control packet, and
wherein the action comprises:
setting an overload parameter, associated with a BFD session of the first network device, to a particular value; and
increasing, based on the particular value, the route cost.

4. The method of claim 1, further comprising:
determining to transition from the maintenance mode to an active mode;
generating another packet that includes an indication that the first network device is in the active mode; and
transmitting the other packet to permit the second network device to perform another action based on the indication that the first network device is in the active mode.

5. The method of claim 1, further comprising:
transmitting the packet based on a time interval for transmitting control packets in a bidirectional forwarding detection (BFD) session.

6. The method of claim 1, wherein the action comprises:
decreasing a preference of one or more routes that include the link; and
transmitting an indication of the decreased preference of the one or more routes to other network devices in a network associated with the first network device.

7. The method of claim 1, wherein the packet is a bidirectional forwarding detection (BFD) control packet, and
wherein the field is a diagnostic code field.

8. A first network device, comprising:
one or more memories; and
one or more processors to:
transition to a maintenance mode;
generate, based on transitioning to the maintenance mode, a packet that includes a field indicating that the first network device is in the maintenance mode associated with enabling maintenance of the first network device; and
transmit, to a second network device, the packet to permit the second network device to perform an action that includes increasing a route cost of a route associated with a link between the first network device and the second network device.

9. The first network device of claim 8, wherein the field includes a particular value associated with an overload including at least one of:
a first indicator indicating that the first network device cannot process additional forwarding plane traffic, or
a second indicator indicating that the forwarding plane traffic should be redirected away from the first network device.

10. The first network device of claim 8, wherein the packet is a bidirectional forwarding detection (BFD) control packet, and
wherein the action comprises:
setting an overload parameter, associated with a BFD session of the first network device, to a particular value; and
increasing, based on the particular value, the route cost.

11. The first network device of claim 8, wherein the one or more processors are further to:
determine to transition from the maintenance mode to an active mode;
generate another packet that includes an indication that the first network device is in the active mode; and
transmit the other packet to permit the second network device to perform another action based on the indication that the first network device is in the active mode.

12. The first network device of claim 8, wherein the one or more processors are further to:
transmit the packet based on a time interval for transmitting control packets in a bidirectional forwarding detection (BFD) session.

13. The first network device of claim 8, wherein the action comprises:
decreasing a preference of one or more routes that include the link; and
transmitting an indication of the decreased preference of the one or more routes to other network devices in a network associated with the first network device.

14. The first network device of claim 8, wherein the packet is a bidirectional forwarding detection (BFD) control packet, and
wherein the field is a diagnostic code field.

15. A non-transitory computer-readable medium storing a set of instructions, the set of instructions comprising:
one or more instructions that, when executed by one or more processors of a first network device, cause the first network device to:
transition to a maintenance mode associated with enabling maintenance of the first network device;
generate, based on transitioning to the maintenance mode, a packet that includes a field indicating that the first network device is in the maintenance mode; and
transmit, to a second network device, the packet to permit the second network device to perform an action based on the field,
wherein the action includes increasing a route cost of a route associated with a link between the first network device and the second network device.

16. The non-transitory computer-readable medium of claim 15, wherein the field includes a particular value associated with an overload including at least one of:
a first indicator indicating that the first network device cannot process additional forwarding plane traffic, or
a second indicator indicating that the forwarding plane traffic should be redirected away from the first network device.

17. The non-transitory computer-readable medium of claim 15, wherein the packet is a bidirectional forwarding detection (BFD) control packet, and
wherein the action comprises:
setting an overload parameter, associated with a BFD session of the first network device, to a particular value; and
increasing, based on the particular value, the route cost.

18. The non-transitory computer-readable medium of claim 15, wherein the one or more instructions further cause the first network device to:
determine to transition from the maintenance mode to an active mode;
generate another packet that includes an indication that the first network device is in the active mode; and
transmit the other packet to permit the second network device to perform another action based on the indication that the first network device is in the active mode.

19. The non-transitory computer-readable medium of claim 15, wherein the one or more instructions further cause the first network device to:

transmit the packet based on a time interval for transmitting control packets in a bidirectional forwarding detection (BFD) session.

20. The non-transitory computer-readable medium of claim 15, wherein the action comprises:
  decreasing a preference of one or more routes that include the link; and
  transmitting an indication of the decreased preference of the one or more routes to other network devices in a network associated with the first network device.

* * * * *